United States Patent [19]
Dembowski et al.

[11] 3,715,172
[45] Feb. 6, 1973

[54] UREA- AND MELAMINE-FORMALDEHYDE BRIDGING AGENTS

[75] Inventors: Ronald J. Dembowski, Calumet City; Theodore R. Schuh, North Riverside, both of Ill.

[73] Assignee: Nalco Chemical Company, Chicago, Ill.

[22] Filed: Jan. 12, 1971

[21] Appl. No.: 105,987

[52] U.S. Cl. ............260/3, 260/41 R, 260/41 A, 260/41.5 R, 260/41.5 A, 260/851, 260/852, 260/856
[51] Int. Cl. ........C08c 9/16, C08d 9/10, C08g 37/32
[58] Field of Search ................250/3, 852, 39 R, 851

[56] References Cited

UNITED STATES PATENTS

| | | | |
|---|---|---|---|
| 3,553,115 | 1/1971 | Curchod et al. | 260/3 |
| 3,509,098 | 4/1971 | Curchod et al. | 260/3 |
| 3,405,079 | 10/1968 | Huang et al. | 260/3 |
| 3,522,127 | 7/1970 | Osborne | 260/852 |
| 3,003,990 | 10/1961 | Umland et al. | 260/852 |
| 2,916,471 | 12/1959 | Rosahl et al. | 260/852 |
| 3,219,600 | 11/1965 | Rucker | 260/852 |
| 3,440,184 | 4/1969 | Erickson et al. | 260/852 |
| 2,500,517 | 3/1950 | Carswell | 260/852 |
| 2,563,897 | 8/1951 | Wilson et al. | 260/852 |
| 3,410,649 | 11/1968 | Sellet | 260/3 |

FOREIGN PATENTS OR APPLICATIONS

| | | | |
|---|---|---|---|
| 741,646 | 12/1955 | Great Britain | 260/852 |
| 1,422,099 | 11/1965 | France | 260/852 |
| 1,453,750 | 8/1966 | France | 260/852 |

*Primary Examiner*—John C. Bleutge
*Attorney*—John G. Premo, Charles W. Connors, Edward A. Ptacek and John S. Roberts, Jr.

[57] ABSTRACT

Method and composition for a dry mix utilizing a natural or synthetic rubber stock containing a non-reinforcing filler and about 0.1 to 10 phr of an aminoplast polymer optimally modified by about 5–20 molar per cent of a polyamine.

4 Claims, No Drawings

UREA- AND MELAMINE- FORMALDEHYDE BRIDGING AGENTS

This invention relates to novel rubber compositions with improved physical properties, and method of making them. More specifically, the invention is concerned with natural and synthetic raw rubbers having improved physical properties by reason of their content of non-reinforcing fillers and urea and melamine formaldehyde compositions and cationic modified versions thereof.

In order to improve the physical properties of both natural and synthetic rubber polymers, various compounds, inorganic and organic, are added and intimately blended with the crude rubber to produce a stock with vastly improved physical characteristics. There is a continuous striving in the art to produce final rubber-like products which have, for example, increased tensile strength, tear and abrasion resistance, and improved modulus. In addition, many substances are added in order to reduce the overall cost of the final rubber product with substantially no sacrifice of desired physical characteristics. For example, dry pigments, other than those substances acting as vulcanizing agents or vulcanizing aids, are often added to rubber. These pigments both improve the properties of the vulcanizates while also serving as diluents or extenders. The most desirable situation is achieved by addition of a low cost additive which not only acts to dilute the crude rubber and lessen its final cost, but also improves the physical products of the formed rubber product with regard to such characteristics as modulus and ultimate tensile strength.

Dry pigments as additives for rubber are loosely classified either as reinforcing agents or fillers. The former improve the properties of both natural and synthetic vulcanizates, while the latter serve generally as diluents. The most widely used reinforcing agent in the rubber industry today is carbon black. This substance is normally used in all rubber articles which have to meet severe service conditions, and improves the various physical properties of rubber compounds such as tensile strength, tear resistance and abrasion resistance. A particularly desirable property incorporated into rubber by the use of carbon black is high tensile strength. This is probably due to some type of tight chemical bonding between the carbon black and the base crude rubber, which bonding is effected by various processing steps.

With respect to non-black pigments known as fillers or non-reinforcing agents, only a small amount of reinforcement results from their use. Normally, they act primarily as diluents and have, therefore, certain serious shortcomings when incorporated into raw rubbers, especially with regard to the physical strength of the final modified rubber products. However, while shaped rubber elements containing these non-reinforcing fillers tend to have less tensile strength and elongation than corresponding articles containing carbon black, the use of non-reinforcing fillers permits the making of white or colored objects, which is impossible when using a black pigment. Therefore, these fillers are widely used in spite of consequent loss of certain desirable physical properties.

Therefore, it would be an advantage to the art to increase the reinforcing ability of color-neutral, colored, or colorless non-reinforcing type fillers or diluents, if such a process could be accomplished with ease and little increase in the cost of the final rubber-like product. If some class of compounds could be synthesized which act as bonding or bridging agents between the fillers and crude rubber or synthetic elastomers whereby excellent tensile strength, high elongation, and excellent tear resistance could be effected, it would be a valuable contribution, especially with regard to rubber products which are either colorless or pigmented with a color other than black.

Therefore, it is a purpose of the invention to devise a method for reinforcing natural and synthetic polymeric crude rubbers employing fillers which are normally considered non-reinforcing and which act as bridging additive agents.

THE PRIOR PATENT ART

U.S. Pat. No. 2,500,517 — Carswell (Monsanto) wherein the inventor utilizes methylol derivatives of melamine and ethers thereof as a sulfur substitute for a curing agent.

U.S. Pat. No. 3,003,990 — Umland II et al. (ERE)

Here the invention lies in precoating a kaolin filler via slurry with a water-dispersible urea-formaldehyde (U/F) product or a diamine and using the product in compounding with butyl rubber (GR-I or IIR).

U.S. Pat. No. 3,224,998 — Kirkconnell (Nalco)

Improvement of subsequent properties in a natural or synthetic rubber mix by incorporating as a mix component or precoating the non-reinforcing filler components with a polyamine such as a polyalkylene polyamine when all available hydrogens of the reactive or free nitrogens have been reacted or blocked by butylene oxide or higher alkylene oxide adducts.

U.S. Pat. No. 3,440,184 — Erickson et al (Dow)

Contemplates a mix of an aqueous dispersion of a high and low styrene latex, a water-dispersible melamine-formaldehyde resin, and a filler, and foaming the composition to improve shock-absorbing properties.

None of these patents produces a dry rubber mix of subsequent improved properties comprising utilizing with a natural or synthetic rubber stock containing a non-reinforcing filler, about 0.1–10 phr of an aminoplast polymer or resin optimally modified by about 5 to 20 percent addition to the amine component of a polyamine to provide cationic sites in the polymer. The aminoplast additive or component may also be considered as a so-called "bridging" agent to overcome the adherence differences between the basic rubber ingredient and the non-reinforcing filler. Utilization of the present additives has led to improved final cured compositions specially as to modulus, tensile strength and Shore A hardness.

THE RUBBER MIX OR RECIPE

In the utilization of the present invention, the term "rubber" is designed to include unvulcanized natural and synthetic rubbers such as butadiene-styrene (GRS), butadiene-acrylonitrile (GRN), multi olefin-isobutylene (GR I, also called IIR), neoprene, ethylene-propylene-diene (EPDM), the acrylate rubbers, etc. An alternative expression embracing the rubbers selected for the present invention as noted above is diene rubbers and acrylate rubbers. A preferred rubber for utilization due to cost and general properties is butadiene-styrene (GRS).

In the rubber mix for curing a non-reinforcing filler is added. Such a filler is well known and is selected from non-carbon pigments and clays such as kaolin or bentonite clay, talc, calcium carbonate, silica, titanium oxide, feldspar, etc. Such fillers may be used within wide filler ranges as from 20 parts to 400 parts by weight per hundred parts of rubber (phr). For most purposes, about 50–200 phr will result in a vulcanizate of desired properties (U.S. Pat. No. 3,003,990 Umland, ante). The unvulcanized rubber with at least one non-reinforcing filler is the basic composite to which the present invention adds a minor percentile of an aminoplast polymer in the dry compounding mix or recipe. Such a percentile based on parts per hundred rubber (phr) is in the broad range of 0.1 to 10.0 and with a preferred range of 2–4 phr. The aminoplast is preferably a water-dispersible alkaline catalyzed urea-formaldehyde or melamine-formaldehyde resin or polymer. Optimally, a polyamine with free hydrogens to provide supplemental cationic sites such as an alkylene polyamine illustrated by diethylene triamine or tetraethylene pentamine is added in about 5–20 mol percent based on the nitrogen component of the aminoplast.

The aminoplast additives are also known and designated as bridging agents which are used with a non-reinforcing filler to improve the physical qualities of the filler stock or finished rubber. The parameters and preparations of these bridging agents are described more particularly post.

Other ingredients such as sulfur compounds for curing, antioxidants, etc., find their place in the rubber recipe but the rubber, the non-reinforcing filler and the bridging agents are specific for the methods and compositions of this invention.

It is further understood that after mixing the ingredients, they with necessary curing additives may be cured, shaped and finally hardened.

THE BRIDGING AGENTS

For the present invention, aminoplast polymers selected from cationically modified urea-formaldehyde and melamine-formaldehyde resins are utilized. For example, where urea is used, polymerized methylol products rather than hard infusible acid catalyzed methylene products are required. Therefore, as parameters, preferably mole reactant ratios of formaldehyde/urea and formaldehyde/melamine of about 2.2–2.5 at about 70°–90°C for 30–45 minutes at a pH of about 3.0–4.0 are utilized until the desired viscosity is reached and then the pH is adjusted to 8.5–9.0 to stop the reaction before an infusible product is obtained.

The solution may then be cooled to room temperature and the resin precipitated. Excess formaldehyde may be eliminated by the supplemental addition of urea at the lower temperature or by alcohol addition, e.g., isopropanol with subsequent precipitation.

The preparation of dispersible aminoplast polymers is described particularly in EPT I, Vol. 2, pp. 29–30, "Amino Resins," (1965) and is referred to and incorporated as a part of this invention. The uniformly low average molecular weight for these condensates (U/F < 350 and M/F up to 3000) are reported in ECT II, Vol. 2, page 237 (1963), Wiley.

It has also been found that optimally about 5–20 molar percent of an active polyamine based on the urea or melamine may be added to the basic formulation with improved results. Such polyamine may be preferably selected from such alkylene polyamines as ethylene diamine, triethylene tetramine, diethylene triamine and tetraethylene pentamine, so that additional cationic or hydrogen sites will be attracted to the generally negative sites on the non-reinforcing filler thus complementing charges and working towards improved results in the subsequently finished rubber. Thus alkylene polyamines of relatively low molecular weight and having a plurality of free or available hydrogens proceeding from the nitrogen are preferred.

The role of the cationic polyamine as noted is to provide additional or supplementary positive sites which will be attracted to and neutralize the anionic charge on the clay or other particle of the non-reinforcing filler. The poly functional activity of the polyamine probably accomplishes this role in several routes; by self or compound activity, by reaction with excess formaldehyde present from the aminoplast formation and by cross-linking activity in the rubber base during subsequent vulcanization of the dry mix.

EXAMPLE IA

Preparation of Modified Urea-Formaldehyde Resin

Charge:
| | |
|---|---|
| Urea | 60 gms (1 mol) |
| Formaldehyde | 75 gms (2.5 mols) |
| Diethylene triamine | 10 gms (0.10 mol) |
| Water | 20 gms |

Each of the components in the charge was dissolved and the pH adjusted to an optimum value of 10.5 by a sodium hydroxide. The mixture was then heated to 70°–75C for 45 minutes. With the temperature at 75°C the solution was acidified to a pH of about 3.5. When the viscosity of the solution reached 300 centipoises the pH was again adjusted to 8.0 and 10 percent by weight of isopropanol was added (10 percent calculated on the total weight of mix). The resin or polymer now readily precipitated or isolated in a dry form. The resin was then ball milled to 325 mesh for proper size dispersion in rubber.

EXAMPLE IB

Preparation of Modified Melamine-Formaldehyde Resin

The procedure of Example IA was followed with the exception that the formaldehyde-melamine mol ratio utilized was 3:1 instead of 2.5:1 formaldehyde-to-urea ratio utilized in the previous example.

Additionally, pentaethylene tetramine was substituted as the cationic modifier and utilized in a 20 percent mol ratio compared with the melamine starting material.

EXAMPLE II

A Typical Rubber Test Recipe

| | |
|---|---|
| 1502 SBR - Rubber Institute Grade (Non-pigmented) | 100 phr |
| Kaolin clay (Suprex-J.M. Huber) | 75 |
| Bridging Agent (Modified M/R Resin from Ex. IB) | 2.0 |
| High Aromatic Oil (Tufflo 500-Sinclair) | 8.0 |
| Zinc Oxide (St. Joe Lead Co. No. 42) | 4.0 |
| Sulfur (Rubbermakers Grade) | 3.0 |

| | |
|---|---|
| Stearic Acid | 1.5 |
| Antioxidant 2,2'-methylene-bis (4-methyl-6-t-butyl phenol) | 1.0 |
| Mercaptobenzothiazyldisulfide | 1.0 |
| Tetramethyl thiuram disulfide | 0.2 |

EXAMPLE III

The following results illustrate improvement or change in physical properties from a control rubber lacking only the bridging additive agent:

| | 100% Modulus | 300% Modulus | 500% Modulus | Tensile Strength | Ultimate Elongation | Shore A |
|---|---|---|---|---|---|---|
| Control GRS | 220 | 350 | 560 | 1870 | 745% | 43 |
| Melamine Formaldehyde Resin from Ex. IB | 320 | 680 | 1030 | 2140 | 675% | 48 |

EXAMPLE IV

Additional test results utilizing a styrene butadiene rubber as control and showing the variation of cationically modified M/F or U/F resins as well as the unmodified varieties:

| | Additive Level | 300% Modulus | Ultimate Tensile | Ultimate Elongation | Shore A Hardness |
|---|---|---|---|---|---|
| Control* | | 400 psi | 1700 psi | 700% | 45 |
| Modified M/f resin | 2 phr | 800 psi | 1670 psi | 600% | 61 |
| Modified M/F resin | 3 phr | 780 psi | 1700 psi | 600% | 63 |
| Modified M/F resin | 4 phr | 830 psi | 1800 psi | 580% | 62 |
| M/F resin | 2 phr | 680 psi | 2150 psi | 6800% | 52 |
| U/F resin Modified | 2 phr | 680 psi | 2100 psi | 610% | 55 |
| U/F Modified | 2 phr | 600 psi | 1800 psi | 560% | 55 |
| M/F** | 2 phr | 650 psi | 2150 psi | 660% | 52 |
| TMTDS*** | 2 phr | 600 psi | 980 psi | 210% | 70 |

\* No bridging agent (styrene-butadiene rubber)
\*\* Diethylene triamine was utilized as a modifier with the exception of this mix where tetraethylene pentamine was utilized.
\*\*\* Comparative run with tetramethylthiuram disulfide, an accelerator.

In subsequent runs and mixes, the additive level of the bridging agent was modified from 0.1 to 10 percent and the data indicated that an optimum amount of additive was in the range of about 2–4 phr.

The embodiments of the invention in which an exclusive property or privilege is claimed are defined as follows:

1. A method of preparing a rubber stock selected from the group consisting of diene rubber and acrylate rubber and containing a non-reinforcing filler which comprises forming the stock into a dry mix and adding thereto 0.1 to 10 phr of an aminoplast polymer selected from a group consisting of polyamine modified, urea-formaldehyde, and melamine-formaldehyde compositions wherein the polyamine constituent is utilized in about 5–20 percent based upon the molar amine content of the aminoplast and subsequently uniformly blending, shaping and vulcanizing said mix.

2. A method according to claim 1 wherein about 2 to 4 phr of an aminoplast polymer is added.

3. A rubber-bridging composition suitable for vulcanizing which comprises as essential ingredients a dry mix of a rubber selected from a group consisting of diene rubbers and acrylate rubbers, a non-reinforcing rubber filler and about 0.1 to 10 phr of an aminoplast polymer selected from polyamine modified, urea- and melamine-formaldehyde polymers wherein the polyamine constituent is present in about 5–20 percent based upon the molar amine content of the aminoplast.

4. A composition according to claim 3 wherein the aminoplast is present in about 2–4 phr.

* * * * *